United States Patent
Kotani (10) Patent No.: US 7,508,604 B2
(45) Date of Patent: Mar. 24, 2009

(54) OPTICAL LENS AND OPTICAL LENS MANUFACTURING METHOD

(75) Inventor: Kyoko Kotani, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 165 days.

(21) Appl. No.: 11/529,366

(22) Filed: Sep. 29, 2006

(65) Prior Publication Data

US 2007/0075220 A1    Apr. 5, 2007

(30) Foreign Application Priority Data

Sep. 30, 2005  (JP) .............................. 2005-288360

(51) Int. Cl.
*G02B 7/02* (2006.01)
*G02B 3/00* (2006.01)
*B29D 11/00* (2006.01)

(52) U.S. Cl. ...................... 359/819; 359/642; 264/1.32

(58) Field of Classification Search ................ 359/642, 359/664, 665, 708, 741, 819–823; 264/1.32, 264/1.7
See application file for complete search history.

(56) References Cited

U.S. PATENT DOCUMENTS

| 4,645,523 | A | * | 2/1987 | Howard et al. ................ 65/385 |
| 6,916,095 | B2 | * | 7/2005 | Iori et al. ..................... 351/165 |
| 7,205,526 | B2 | * | 4/2007 | Li et al. ....................... 250/216 |
| 7,301,706 | B2 | * | 11/2007 | Leu ............................. 359/642 |
| 7,338,754 | B2 | * | 3/2008 | Okada et al. ................. 430/321 |

FOREIGN PATENT DOCUMENTS

JP    2003-139917    5/2003

* cited by examiner

*Primary Examiner*—Mohammed Hasan
(74) *Attorney, Agent, or Firm*—Rabin & Berdo, P.C.

(57) ABSTRACT

The manufacturing method uses a substrate including an SOI layer (112), a SiO$_2$ layer (114) and a Si layer (116). A lens surface (118) is formed on the surface of the SOI layer (112) of the substrate. A lens region including the lens surface (118) and an edge section (120) there around is formed by removing the SOI layer (112), with the exception of a section corresponding to the lens region, until the SiO$_2$ layer (114) is exposed, such that the SOI layer (112) only remains in the lens region. A lens holding section (122) that holds the lens region is formed by removing the Si layer (116), with the exception of a section of the Si layer (116) corresponding to the lens holding section (122), until the SiO$_2$ layer (114) is exposed at the rear surface of the substrate.

10 Claims, 12 Drawing Sheets

OPTICAL LENS AND OPTICAL LENS MANUFACTURING METHOD

CROSS REFERENCE TO RELATED APPLICATIONS

The disclosure of Japanese Patent Application No. JP-A-2005-288360 filed Sep. 30, 2005, entitled "Optical Lens and Optical Lens Manufacturing Method", including the specification, drawings and abstract thereof, is incorporated herein by reference in its entirety.

BACKGROUND OF THE INVENTION

The present invention relates to an optical lens that is used in an optical device, and a manufacturing method for the optical lens. In particular, the invention relates to an optical lens that can be used in an infrared light region with a wavelength range from 0.70 µm to 11 µm, and a manufacturing method for the optical lens.

DESCRIPTION OF THE RELATED ART

Methods of forming a lens element are known such as the method disclosed in Japanese Patent Laid-open Publication No. JP-A-2003-139917. The method disclosed in this publication uses a crystal substrate as an optical substrate for forming the lens element. Next, the lens element manufacturing method will be explained. FIG. 12 is a schematic cross sectional view that illustrates this known optical lens manufacturing method. In this case, a Silicon (Si) on Insulator (SOI) substrate is used, for example, as the optical substrate.

Figure 12A:
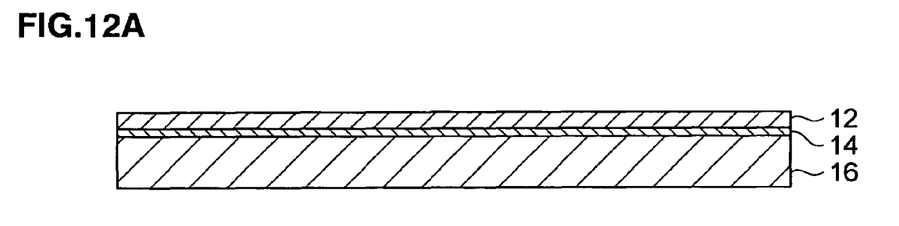
FIG. 12 is an explanatory figure illustrating a known optical lens and a manufacturing method thereof.

Referring to FIG. 12A, the SOI has a structure including an SOI layer 12 as an upper layer, an Si layer 16 as a lower layer, and an $SiO_2$ layer 14 as an intermediate layer interposed therebetween. Note that, the SOI layer 12 is formed from Si. The SOI substrate may use a substrate with a diameter of, for example, 4 inches. With regard to the thickness of the respective layers, for example, the SOI layer 12 may be 100 µm, the $SiO_2$ layer 14 may be 1 to 2 µm, and the Si layer 16 may be 500 µm.

Figure 12B:
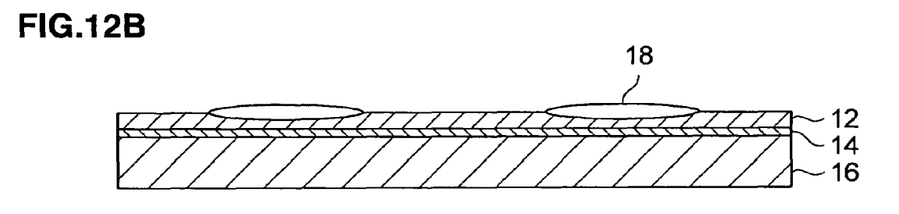

First, referring to FIG. 12B, a plurality of lens surfaces 18 are formed at predetermined intervals apart on the surface of the SOI layer 12. The shape of the lens surfaces 18 may be that of a diffraction lens, a refraction lens, or the like, and etching or grinding etc. may be used for the forming method. One example of how the lens surfaces 18 are formed is as follows. The surface of the SOI layer 12 is etched using a photolitho-etching technique used in, for example, semi-conductor technology, thereby allowing the plurality of lens surfaces 18, which have predetermined optical characteristics, to be formed together and with high accuracy.

Figure 12C:
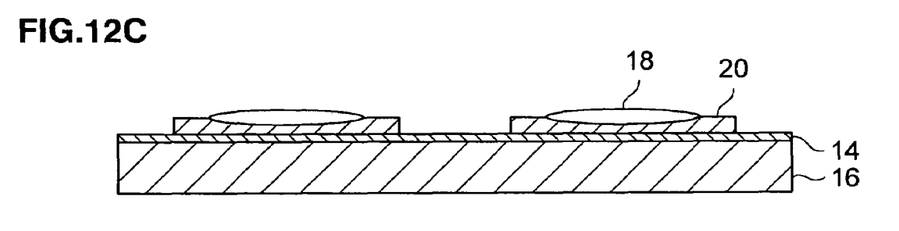
Figure 12D:
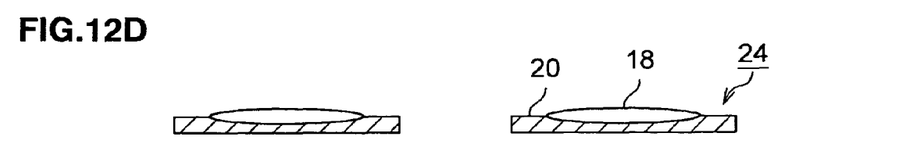

Next, as can be seen from FIG. 12C, an attachment-support section 20 and an edge section around the periphery of each lens surface 18 are formed. In this process, a pattern with a shape corresponding to each lens surface 18 and edge section and the attachment-support section 20 is covered with an etching mask so as to partially cover the SOI layer 12. Then, the regions of the SOI layer 12 that are not covered by the mask are etched until the upper surface of the $SiO_2$ layer 14 is exposed, thereby forming the lens elements 24 on the substrate. Next, the formed plurality of the lens elements 24 are, for example, grinded, etc, while being held by a holding substrate. Finally, as shown in FIG. 12D, the lens elements 24 defined by each lens region are respectively separated and removed from the holding substrate.

The lenses using a silicon material manufactured using the above known manufacturing method have a lens thickness of around 100 to 600 µm. Light in the near-infrared region (wavelength of 750 to 1100 nm) and light in the vicinity of the 9 µm wavelength in the infrared region is absorbed by the silicon and cannot pass there through. In order to allow light of this wavelength to pass through the lens, the thickness of the silicon lens has to be reduced. However, with the above know manufacturing method, if the thickness of the silicon lens is reduced, it is not possible to hold the lens.

SUMMARY OF THE INVENTION

The invention has been devised in light of the above problems of known optical lenses and the manufacturing methods thereof. It is an object of the invention to provide a new and innovative optical lens, and a manufacturing method for the optical lens, that allows near-infrared region light to pass through the optical lens as a result of using thin silicon to form the lens. In addition, in relation to this object, when thin silicon is used in the known art, after the lens section is separated, it is not possible for it to be held separately. However, the invention provides a technique that allows the lens section to be held separately.

In order to solve the above described problems, a first aspect of the invention provides a method for manufacturing an optical lens. The method for manufacturing an optical lens according to the present invention uses a substrate including a first layer, a second layer and a third layer, and includes a first step of forming a lens surface on a surface of the first layer of the substrate. In a second step, a lens holding section is formed that holds a lens region including the lens surface and an edge section around the lens surface. The lens holding section is formed by removing the third layer, with the exception of a section of the third layer that corresponds to the lens holding section, until the second layer is exposed at a rear surface of the substrate.

In addition, in order to solve the above described problems, a second aspect of the invention provides another manufacturing method for an optical lens. This method for manufacturing an optical lens according to the invention uses a substrate including a first layer, a second layer and a third layer, and includes a first step of forming a lens surface on a surface of the first layer of the substrate. In a second step, a lens region including the lens surface and an edge section around the lens surface is formed by removing the first layer, with the exception of a section of the first layer that corresponds to the lens region, until the second layer is exposed such that the first layer only remains in the lens region. In a third step, a lens holding section is formed that holds the lens region by removing the third layer, with the exception of a section of the third layer that corresponds to the lens holding section, until the second layer is exposed at the rear surface of the substrate.

According to the above manufacturing methods, the lens holding section (a support wall) is formed that holds the lens region. With the known art, if thin silicon is used, the lens section cannot be independently held after separation. However, according to the present invention, a structure is used in which a lens outer periphery section is provided with a degree of thickness, thereby allowing the lens section to be held.

The second layer may be an etching resistant layer that is highly resistant to etching. In addition, the lens region forming step may further include an etching process step in which the second layer acts as an etching stopper. Performing the etching process using the second layer as an etching stopper makes it easier to perform the lens region forming step.

As a result of forming the lens holding section, even if the thickness of the lens surface is reduced, the lens section can still be held. The thickness of the lens surface may be, for example, 5 µm or less (for example, 1 to 5 µm). Forming the lens surface thinner makes it possible for near-infrared region light to pass there through.

Moreover, similarly, the second layer may be an etching resistant layer that is highly resistant to etching, and the lens holding section forming step may further include an etching process step in which the second layer acts as an etching stopper. As a result of using the second layer as an etching stopper in the etching process, the lens holding section forming step can be performed more easily.

After the lens holding section forming step is completed, the second layer may be removed from the rear surface of the substrate. The second layer may be removed in the case that it is un-required. Alternatively, the second layer may be left. By adjusting the thickness of the second layer in advance, the remaining second layer may be used as an anti-reflection film. This structural feature will be described in more detail later.

In the lens surface forming step, a plurality of lens surfaces may be formed on the substrate. In addition, after the lens holding section forming step is completed, respective optical lenses defined by the respective lens regions may be separated from the substrate. Accordingly, it is possible for a plurality of lenses to be formed from one substrate. Note that, the optical lenses separated in the separation step may include one lens surface in one lens element, or may include a lens array with a plurality of lens surfaces in one lens element.

The substrate may be, for example, a silicon on insulator (SOI) substrate. An SOI substrate has a structure that includes an $SiO_2$ layer inserted between an Si substrate and a surface Si layer. Accordingly, an SOI substrate is favorable for a structure like that of the present invention that includes a first layer, a second layer, and a third layer.

In order to solve the above described problems, a third aspect of the present invention provides another manufacturing method for an optical lens. This manufacturing method for an optical lens according to the present invention includes a first step of forming a lens surface on a surface of a substrate. In a second step, a lens region that includes the lens surface and a edge section around the lens surface is formed by removing a predetermined thickness of the surface of the substrate, with the exception of a section of the surface that corresponds to the lens region, such that the predetermined thickness of the surface only remains in the lens region. In a third step, a lens holding section that holds the lens region is formed by removing a predetermined thickness of a rear surface of the substrate, with the exception of a section that corresponds to the lens holding section.

According to the above manufacturing method, the lens holding section (a support wall) is formed that holds the lens region. With the known art, if thin silicon is used, the lens section cannot be independently held after separation. However, according to the present invention, a structure is used in which a lens outer periphery section is provided with a degree of thickness, thereby allowing the lens section to be held.

As a result of forming the lens holding section, even if the thickness of the lens surface is reduced, the lens section can still be held. The thickness of the lens surface may be, for example, 5 µm or less (for example, 1 to 5 µm). Forming the lens surface thinner makes it possible for near-infrared region light to pass there through.

In the lens surface forming step, a plurality of lens surfaces may be formed on the substrate. In addition, after the lens holding section forming step is completed, respective optical lenses defined by the respective lens regions may be separated from the substrate. Accordingly, it is possible for a plurality of lenses to be formed from one substrate. Note that, the optical lenses separated in the separation step may include one lens surface in one lens element, or may include a lens array with a plurality of lens surfaces in one lens element.

The substrate may be, for example, a silicon on insulator (SOI) substrate. In order to address the above describe problems, a fourth aspect of the present invention provides an optical lens. The optical lens according to the present invention includes a lens surface formed on a surface of a substrate; and a lens holding section that holds a lens region, including the lens surface and an edge section around the lens surface, from a rear surface of the substrate.

According to the above described structure, the lens holding section is provided for holding a thin lens. Accordingly, for example, an extremely thin silicon lens with thickness of around 1 to 5 µm can be formed, and an optical lens that allows near-infrared light to pass there through can be manufactured. In addition, since the lens can be held, an optical lens can be provided that can be mounted on a module or the like.

As described previously, the lens surface may have a thickness of 5 µm or less.

In addition, the rear surface of the substrate may be formed, with the exception of a section of the rear surface corresponding to the lens holding section, by an anti-reflection film.

Moreover, the substrate may be, for example, a silicon on insulator (SOI) substrate.

As is apparent from the above description, according to the present invention, a thin silicon lens can be formed that allows near-infrared region light to pass there through. With the known art, if thin silicon is used, the lens section cannot be independently held after separation. However, according to the present invention, a structure is used in which a lens outer periphery section is provided with a degree of thickness, thereby allowing the lens section to be held.

DETAILED DESCRIPTION OF THE PREFERRED EMBODIMENTS

Hereinafter, preferred embodiments of an optical lens and a manufacturing method thereof according to the invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Next, a first embodiment of the present invention will be described.

The present embodiment describes an optical lens that is easily handled, and a manufacturing method for the optical lens. The optical lens includes a silicon lens formed using a thin silicon substrate. As a result of using this structure, the optical lens allows light in the near-infrared region (wavelength of 750 to 1100 nm) and light in the vicinity of the 9 μm wavelength in the infrared region to pass there through.

FIG. 1 is an explanatory drawing showing the outline of the manufacturing method for the silicon lens according to the present embodiment. The present embodiment uses an SOI substrate with a diameter of, for example, 4 inches as an optical substrate. The SOI substrate, as can be seen from FIG. 1A, has a structure including an SOI layer 112 as an upper layer (a first layer), an Si layer 116 as a lower layer (a third layer), and an $SiO_2$ layer 114 as an intermediate layer (a second layer) interposed therebetween. With regard to the thickness of the respective layers, for example, the SOI layer 112 may be 5 μm, the $SiO_2$ layer 114 may be 1 to 2 μm, and the Si layer 116 may be 100 μm.

Figure 1A:
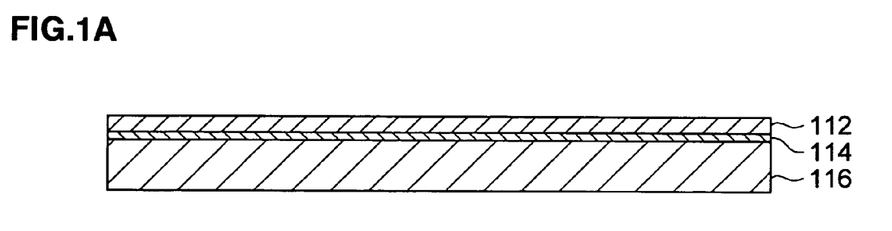
FIG. 1 is an explanatory drawing showing a manufacturing method for an optical lens according to a first embodiment.

The SOI layer 112 is, for example, made of single crystal silicon. However, the invention is not limited to this structure, and the SOI layer 112 may be, for example, an amorphous silicon layer. The wavelength of the absorption edge of the single crystal silicon or the amorphous silicon is 1100 nm in the case of the single crystal silicon and 690 to 770 nm in the case of the amorphous silicon.

Figure 1B:
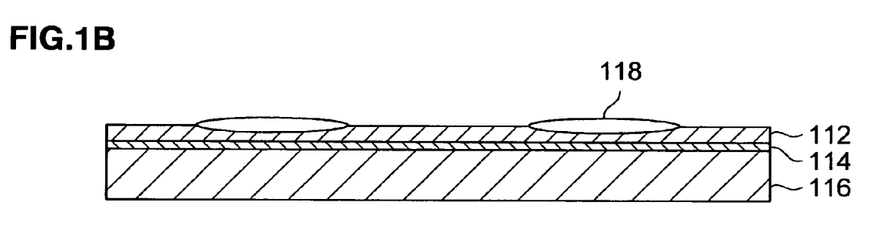

Next, a plurality of lens surfaces 118 are formed at predetermined intervals apart on the surface of the SOI layer 112, as shown in FIG. 1B. The shape of the lens surfaces 118 may be that of a diffraction lens, a refraction lens, or the like, and etching or grinding etc. may be used for the forming method. One example of how the lens surfaces 118 are formed is as follows. A photolitho process and an etching process are repeatedly performed on the surface of the SOI layer using, for example, a photolitho-etching technique used in semiconductor technology, so as to form diffraction optical elements that are used as lenses. Accordingly, high quality lenses with outstanding condensing characteristics can be formed together and with high accuracy.

Figure 1C:
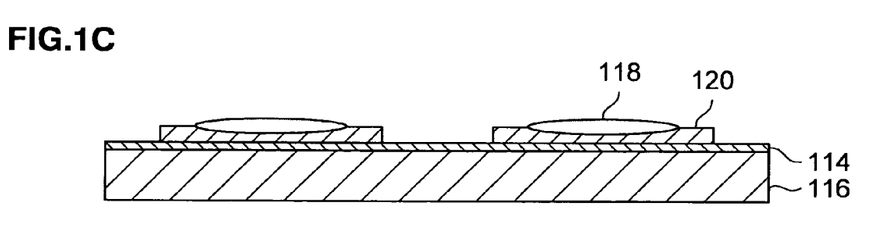
Figure 2:
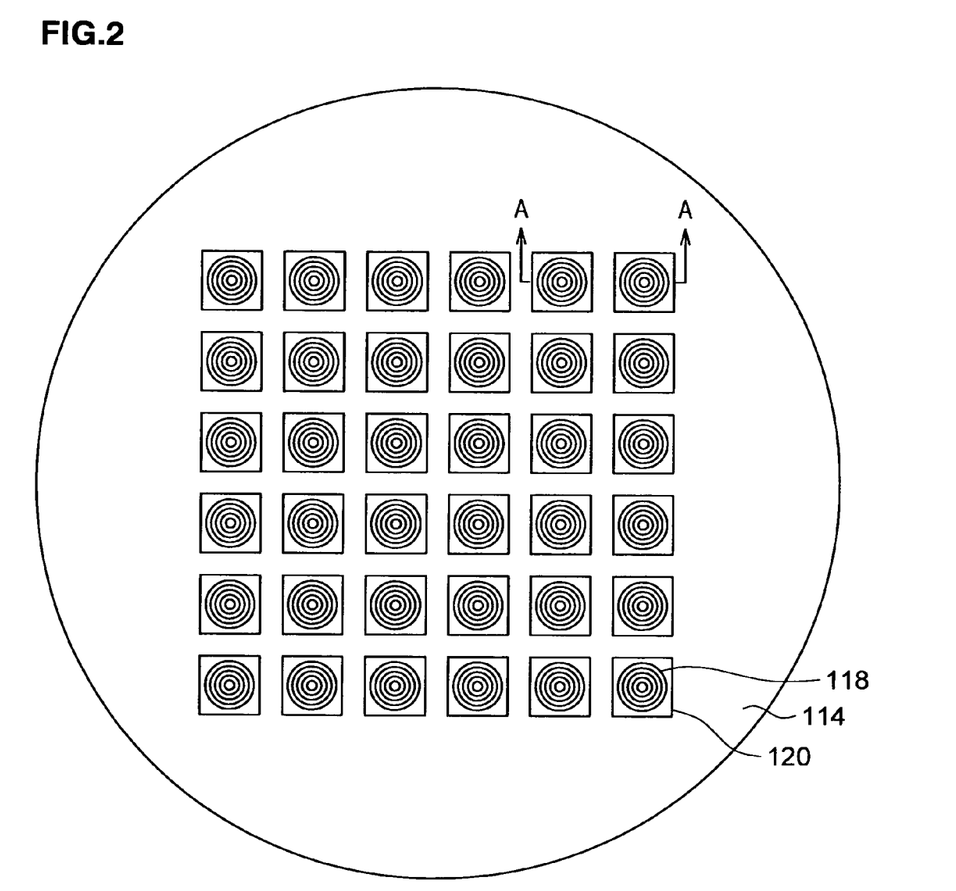
FIG. 2 is a plan view showing lens surfaces formed on a substrate.

Next, referring to FIG. 1C, an edge section 120 is formed around the periphery of each lens surface 118. In this process, first, a pattern with a shape corresponding with each lens surface 118 and edge section 120 is covered with an etching mask so as to partially cover the SOI layer 112. Then, the regions of the SOI layer 112 that are not covered by the mask are etched until the upper surface of the $SiO_2$ layer 114 is exposed. At this time, the $SiO_2$ layer 114 functions as an etching stopper. In this way, the lens elements are formed on the substrate. FIG. 2 is a plan view showing lens surfaces 118 and edge sections 120 formed on the $SiO_2$ layer 114. FIG. 1C corresponds to a cross section along line A-A of FIG. 2.

Figure 1D:
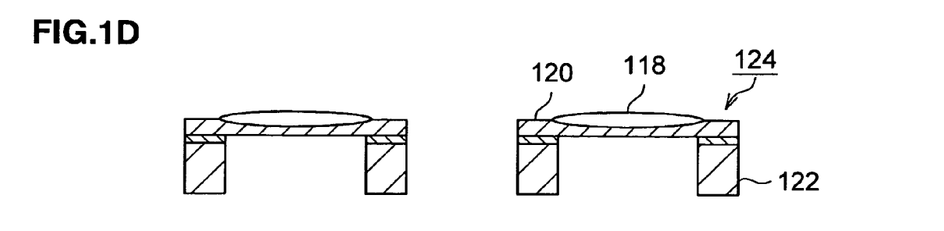

The plurality of lens elements formed in this way are held by a holding substrate. In this state, an etching mask is used to cover a pattern with a shape that corresponds to the edge sections 120 on the Si layer on the lens rear surface. Accordingly, the Si layer is partially covered by the etching mask. As shown in FIG. 1D, the region not covered by the mask is etched. Note that, the explanation given in the present embodiment describes an example in which the edge section is formed around the outer periphery of each unit lens, as shown in FIG. 1D. However, an edge section may be formed around the outer periphery of a lens array. This structure will be discussed in more detail later (a second applied example).

An example of the rear surface removal process illustrated in FIG. 1C to FIG. 1D will be explained while referring to FIG. 3. The process shown in FIG. 3 is used to perform rear surface removal when the lenses are in the state shown in FIG. 1C.

Figure 3A:
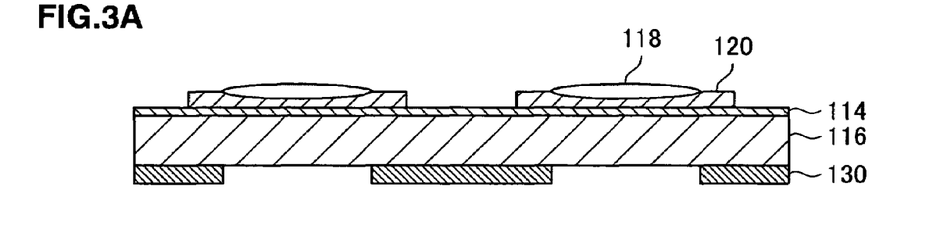
FIG. 3 is an explanatory drawing showing a rear surface removal process.
Figure 3B:
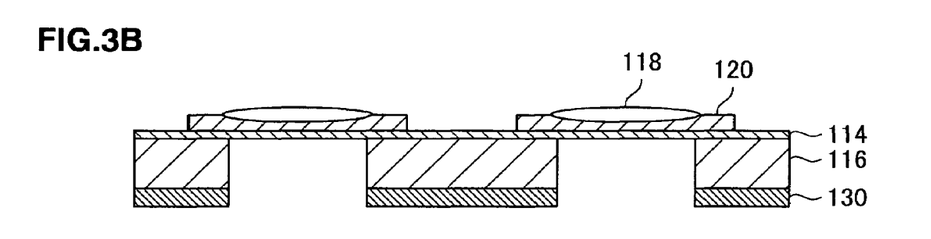
Figure 3C:
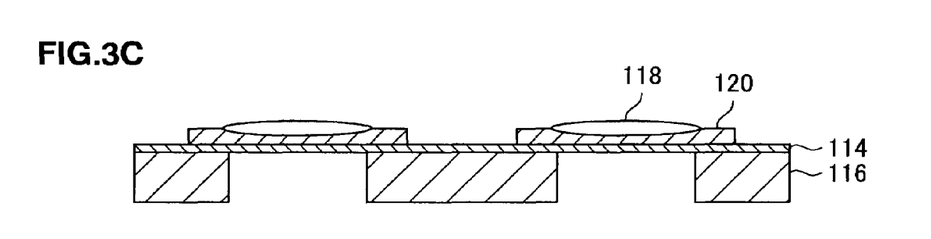
Figure 3D:
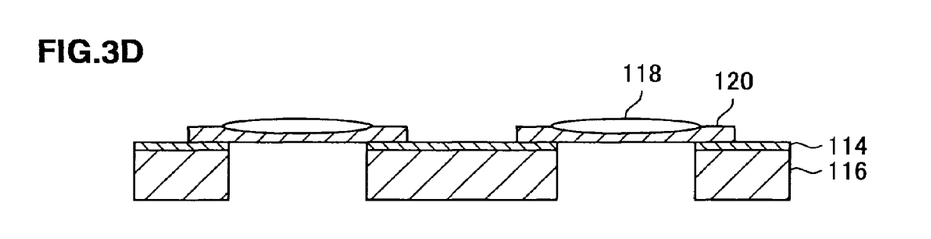
Figure 3E:
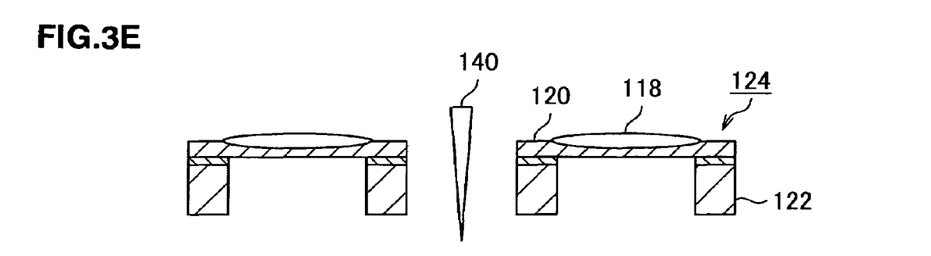

First, referring to FIG. 3A, an etching mask 130 is used to cover the pattern with the shape corresponding to the edge sections on the Si layer of the lens rear surface. Accordingly, the Si layer is partially covered. Then, as shown in FIG. 3B, the sections not covered by the etching mask 130 are etched. Following this, as shown in FIG. 3C, the un-required etching mask 130 is removed. Then, as shown in FIG. 3D, the sections of the $SiO_2$ layer 114 that are not required, which are the sections corresponding to the lens rear surface, are removed. Finally, a dicing saw 140 is used to perform dice cutting, as shown in FIG. 3E, whereby the individual optical lenses 124 shown in FIG. 1D are separated.

Figure 4A:
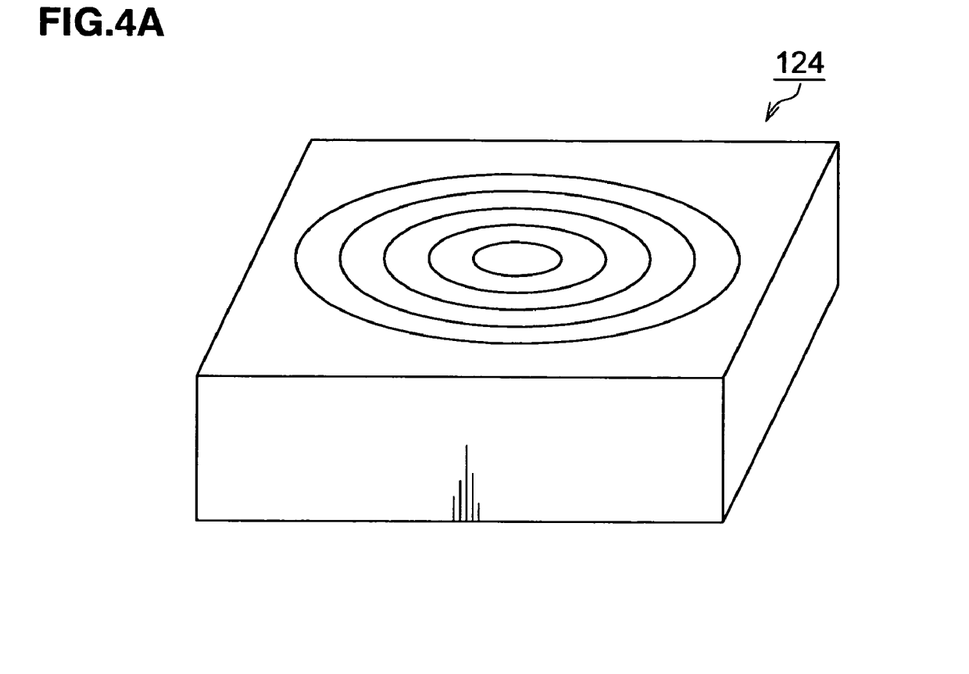
FIG. 4 is an explanatory drawing showing the optical lens in more detail.
Figure 4B:
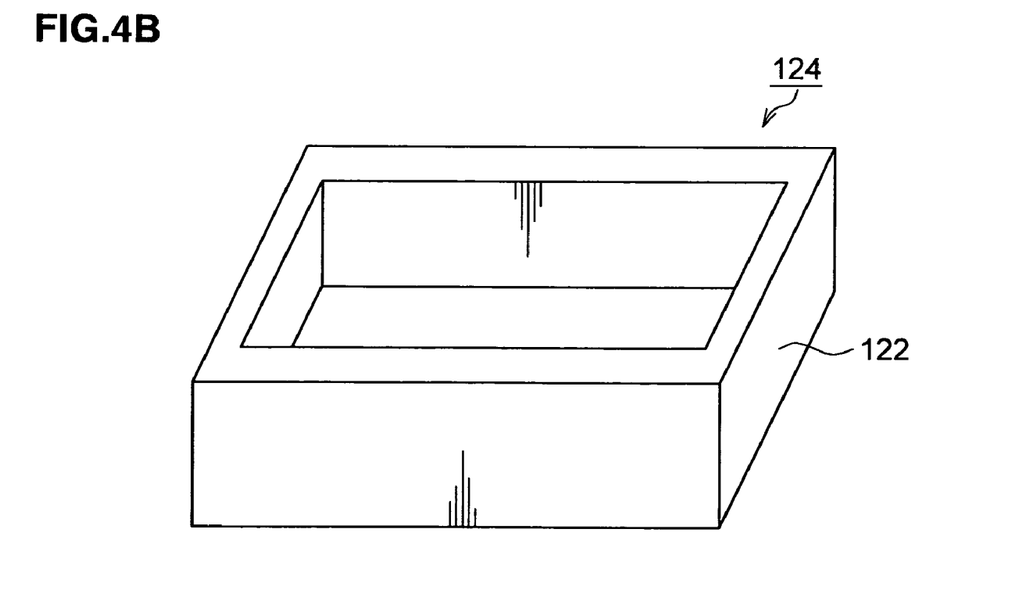

The above process forms easily handled infrared optical lenses 124 with a lens surface thickness of 1 to 5 μm, and a lens holding section 122 with a thickness of 100 μm. FIG. 4 is an explanatory view showing the optical lenses 124 of FIG. 3E in more detail. FIG. 4A is a perspective view, and FIG. 4B is a view from the rear side of FIG. 4A. The optical lenses 124 of the present embodiment, as shown in FIG. 4B, have the lens holding section 122, which has a square-shape, formed around the periphery of each lens.

In the case of a lens using extremely thin silicon of 5 μm, in the known art, it is not possible to hold the lens shape using just the lens surface and handling section on the upper section thereof. With regard to this point, in the present embodiment, a lens holding section with thickness in the order of 100 μm is formed in the lens outer periphery region. Accordingly, the lens can be handled easily.

Figure 5:
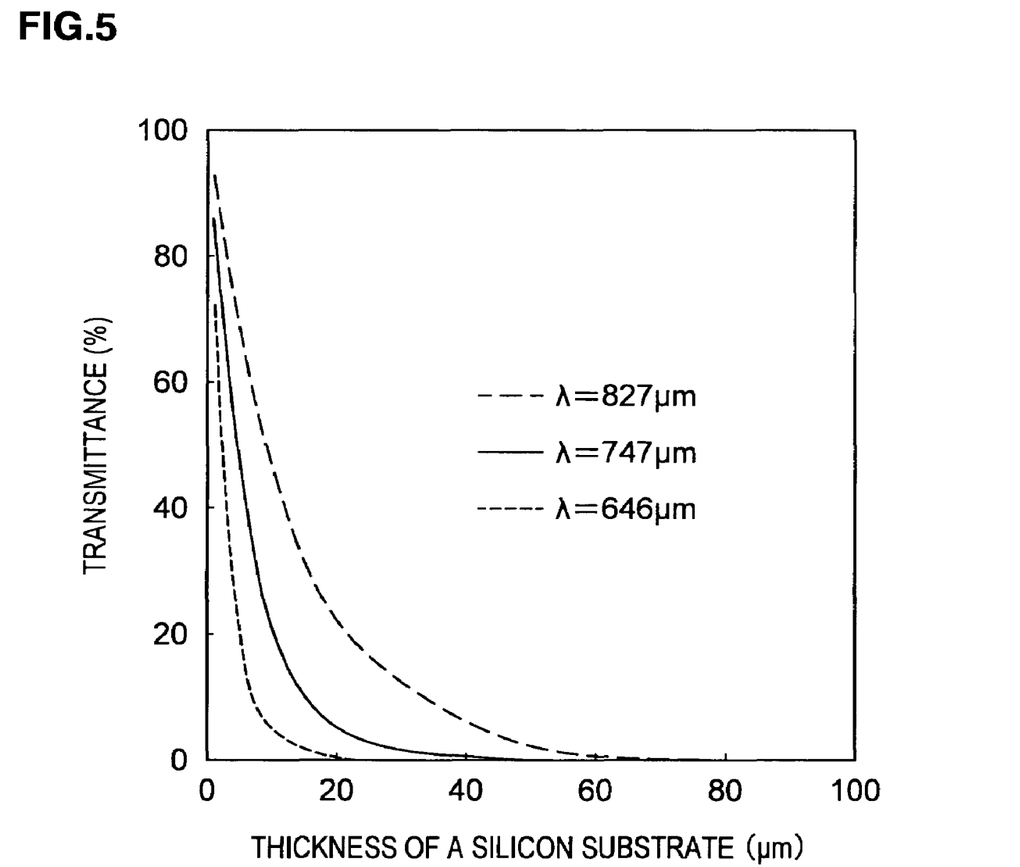
FIG. 5 is an explanatory drawing showing the relationship of the thickness of a silicon substrate and transmittance.

FIG. 5 is an explanatory drawing showing the relationship of the thickness of the lens and transmittance. Referring to FIG. 5, in the 827 nm wavelength region, transmittance is 68% when lens thickness is 5 μm, and transmittance is 93% when lens thickness is 1 μm. For example, in a field requiring transmittance of around 70%, from the point of view of the amount of transmitted light, it would be possible to use a the lens formed using 5 μm thickness silicon.

Effects of the First Embodiment

As described above, according to the present embodiment, it is possible to form an extremely think silicon lens with thickness of around 1 to 5 μm as a result of using a structure provided with a lens surface on a silicon film on an oxide film layer. Accordingly, a lens that allows near-infrared region light to pass through can be manufactured. In addition, in order to hold this thin lens, a supporting section is formed in a periphery section thus allowing the lens to be supported. Accordingly, a lens is provided that can be mounted on modules etc.

Second Embodiment

Next, a second embodiment of the present invention will be explained.

The key feature of the present embodiment is that it uses, as an applied example of the above first embodiment, the oxide film layer of the SOI substrate as an anti-reflection film.

FIG. 6 is an explanatory drawing showing an outline of a manufacturing method for the silicon lens according to the present embodiment. The present embodiment uses an SOI substrate with a diameter of, for example, 4 inches as an optical substrate. The SOI substrate, as can be seen from FIG. 6A, has a structure including an SOI layer 212 as an upper layer (a first layer), an Si layer 216 as a lower layer (a third layer), and an $SiO_2$ layer 214 as an intermediate layer (a second layer) interposed therebetween.

Figure 6A:
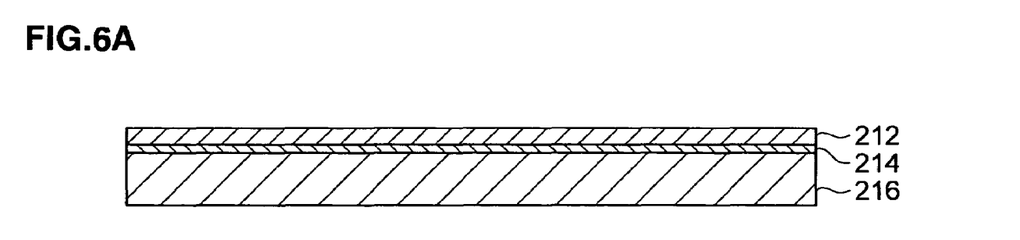
FIG. 6 is an explanatory drawing showing a lens and a manufacturing method thereof according to a second embodiment.

In the present embodiment, the oxide film layer of the SOI substrate has a pre-calculated film thickness, which is a film thickness that is sufficient for the $SiO_2$ layer 214 to be used as an anti-reflection film. For example, if the $SiO_2$ layer 214 has a thickness of 1 μm, reflectance can be controlled to around 7%, and the $SiO_2$ layer is effective as an anti-reflection film. Accordingly, in the present embodiment, the respective layers may have the following thicknesses, for example. The SOI layer 212 may be 5 μm, the $SiO_2$ layer 214 may be 1 μm, and the Si layer 216 may be 100 μm.

The SOI layer 212 is, for example, made of single crystal silicon. However, the invention is not limited to this structure, and the SOI layer 212 may be, for example, an amorphous silicon layer. With regard to this structural feature, the second embodiment is the same as the above described first embodiment.

Figure 6B:
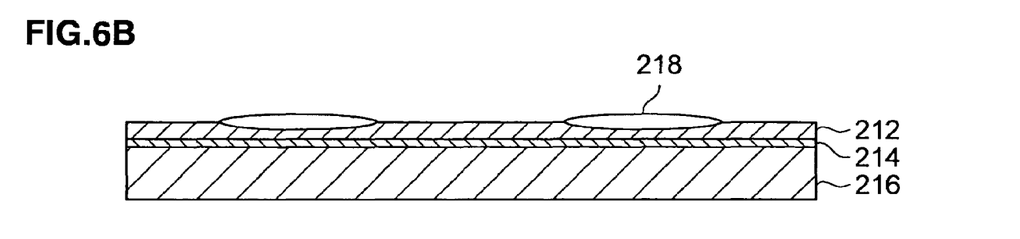

Next, a plurality of lens surfaces 218 are formed at predetermined intervals apart on the surface of the SOI layer 212, as shown in FIG. 6B. The shape of the lens surfaces 218 may be that of a diffraction lens, a refraction lens, or the like, and etching or grinding etc. may be used for the forming method. One example of how the lens surfaces 118 are formed is as follows. A photolitho process and an etching process are repeatedly performed on the surface of the SOI layer 212 using, for example, a photolitho-etching technique used in semi-conductor technology, so as to form diffraction optical elements that are used as lenses. Accordingly, high quality lenses with outstanding condensing characteristics can be formed together and with high accuracy. This process is substantially the same as that used in the first embodiment.

Figure 6C:
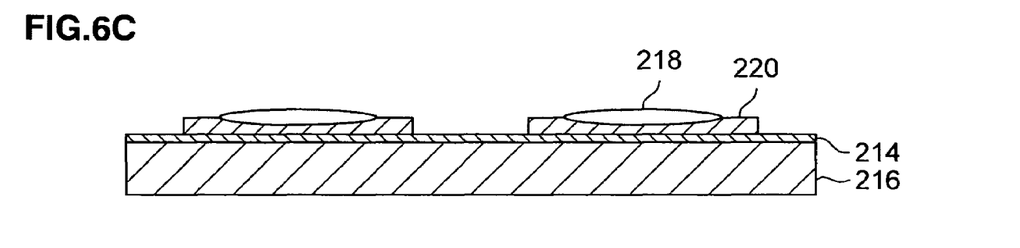
Figure 6D:
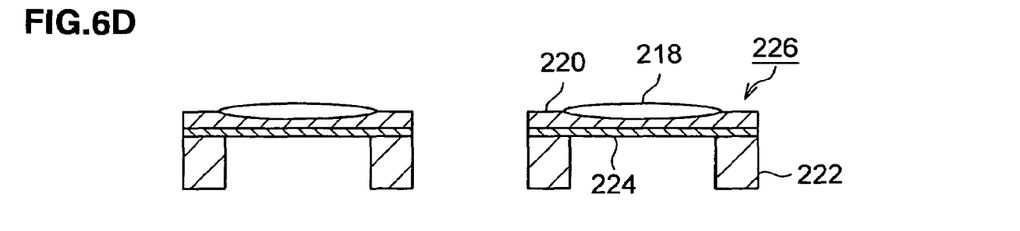

Next, referring to FIG. 6C, an edge section 220 is formed around the periphery of each lens surface 218. In this process, first, a pattern with a shape corresponding with each lens surface 218 and edge section 220 is covered with an etching mask so as to partially cover the SOI layer 212. Then, the regions of the SOI layer 112 that are not covered by the mask are etched until the upper surface of the $SiO_2$ layer 114 is exposed. At this time, the $SiO_2$ layer 214 functions as an etching stopper. In this way, the lens elements are formed on the substrate. This process is substantially the same as that used in the first embodiment. The plurality of lens elements formed in this way are held by a holding substrate. In this state, an etching mask is used to cover a pattern with a shape that corresponds to the edge sections on the Si layer on the lens rear surface. Accordingly, the Si layer is partially covered by the etching mask. As shown in FIG. 6D, the region not covered by the mask is deeply etched. At this time, in the present embodiment, the $SiO_2$ layer on the lens element rear surface is not removed. Thus, an anti-reflection film 224 is formed at the same time at the lens shape.

The above process forms easily handled infrared lenses 124 with a lens surface thickness of 1 to 5 μm, and a lens holding section 222 with a thickness of 100 μm.

Effects of the Second Embodiment

As described above, according to the present embodiment, it is possible to form an extremely thin silicon lens with thickness of around 1 to 5 μm as a result of using a structure provided with a lens surface on a silicon film on an oxide film layer. Accordingly, a lens that allows near-infrared region light to pass through can be manufactured. In addition, in order to hold this thin lens, a supporting section is formed in a periphery section thus allowing the lens to be supported. Accordingly, a lens is provided that can be mounted on modules etc.

Moreover, the oxide film layer of the silicon lens manufactured using the SOI substrate is used as an anti-reflection film. As a result, it is easy to form the anti-reflection film of the silicon lens, which is used for near-infrared region light and which has extremely thin lens thickness. Further, in the case of a normal silicon lens where the anti-reflection film is applied after the lens is formed, peeling or breaking caused by warping etc. may occur if a lens with thin film thickness is used. However, the method of the present embodiment, where the oxide film layer is used as is, is beneficial from the point of view of process simplification and lens performance improvement.

First Applied Example

Figure 7A:
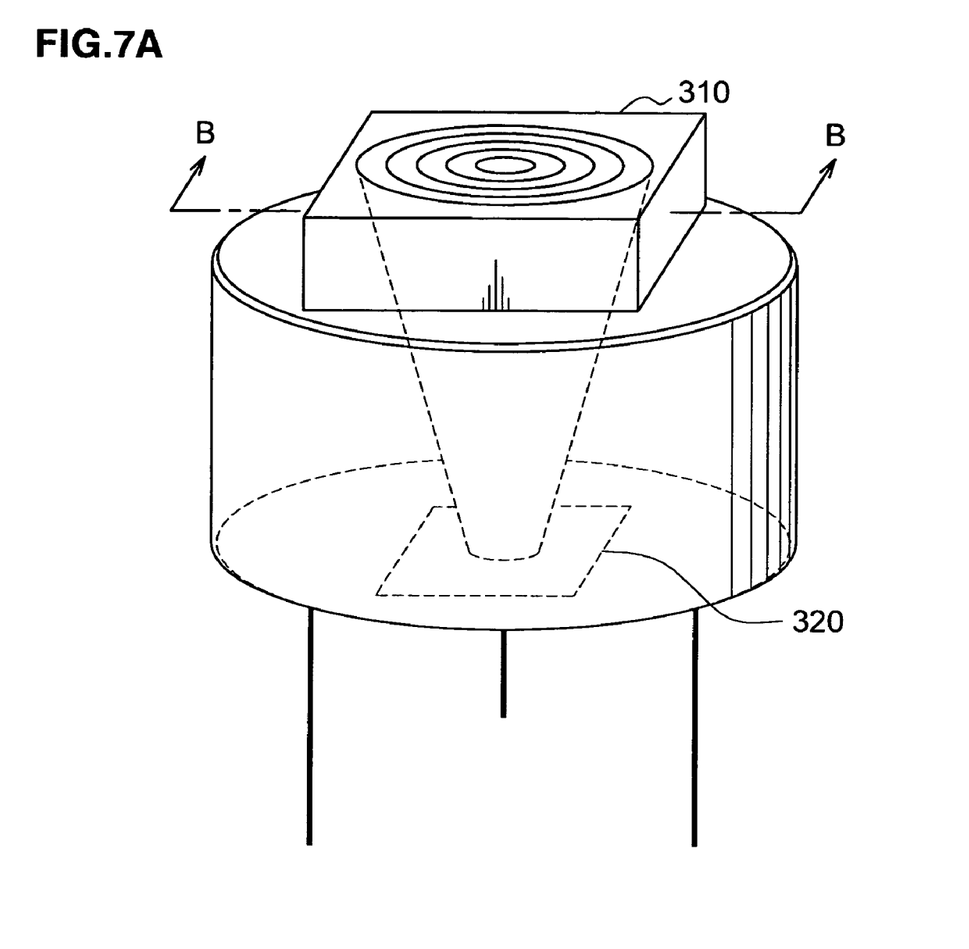
FIG. 7 is an explanatory drawing showing an example (a first applied example) in which an optical sensor is formed.
Figure 7B:
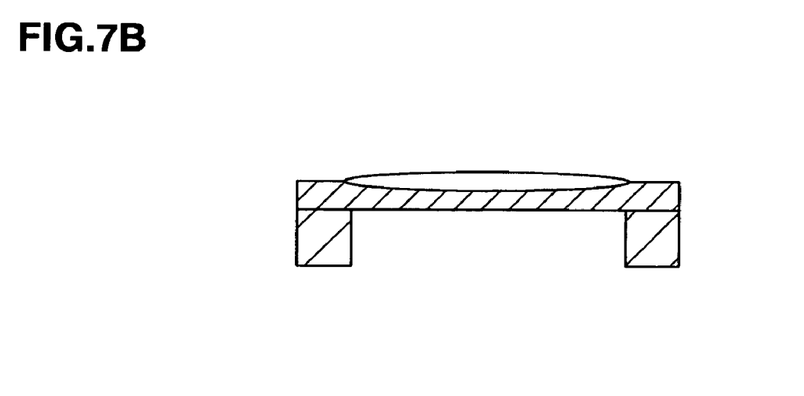

FIG. 7 shows an explanatory drawing of an infrared sensor that utilizes the optical lens of the above embodiment as a first applied example. FIG. 7A shows the infrared sensor when light from a lens element 310 is incident on a light receiving section 320. FIG. 7B is a cross sectional view of the lens element 310 along the line BB in FIG. 7A. FIG. 7B corresponds to the cross sectional view of the lens element in FIG. 1D.

Second Applied Example

Figure 8A:
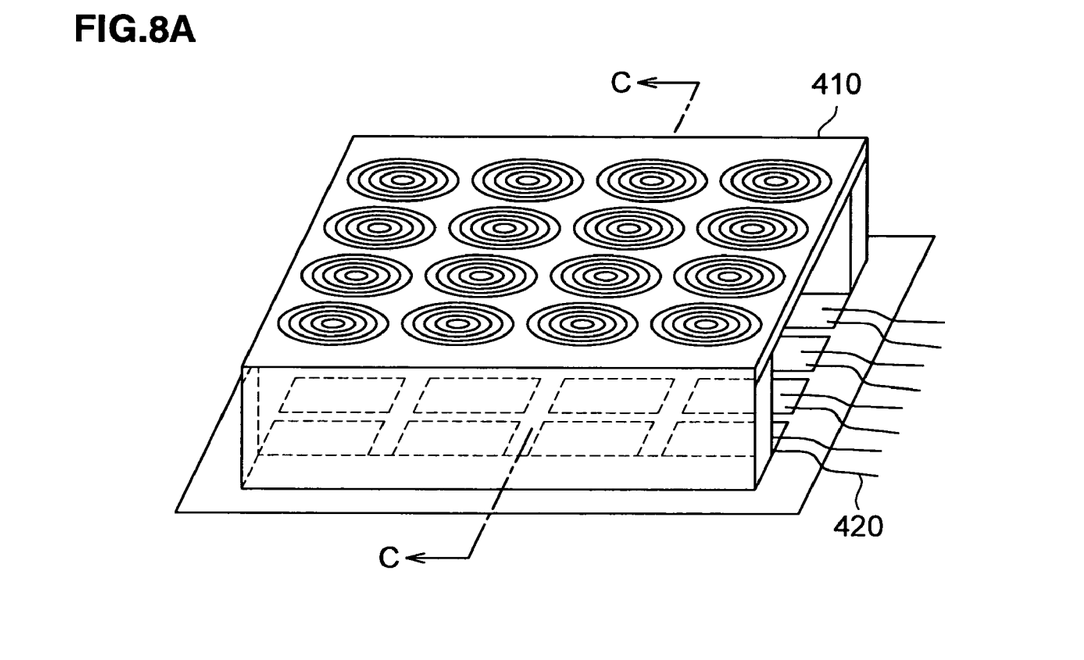
FIG. 8 is an explanatory drawing showing an example (a second applied example) in which a lens array is formed.
Figure 8B:
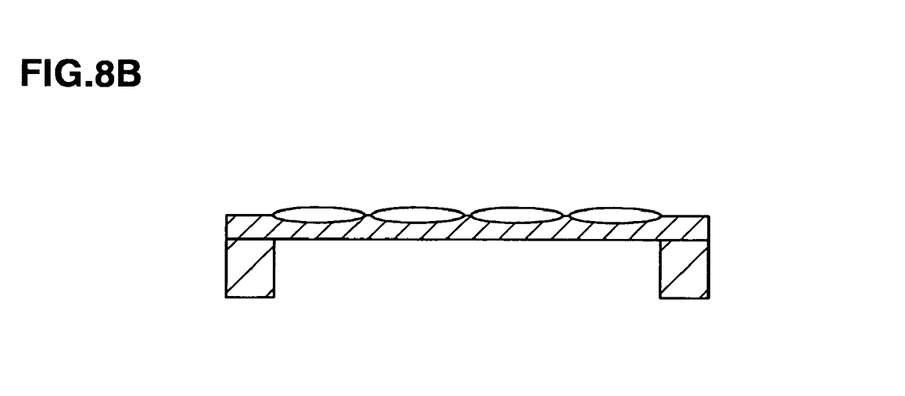

FIG. 8 is an explanatory figure of a second applied example in which a lens array is formed using an integrated edge section formed around the periphery of a plurality of lenses. FIG. 8A shows a lens array 410 mounted to a mounting surface, and FIG. 8B is a cross sectional view along line C-C of FIG. 8A. As is apparent from FIG. 8A, as a result of forming the edge section with a side-ways U-shape, it is possible for the wiring 420 to be provided on the mounting surface such that the wiring 420 can be easily removed.

Third Applied Example

In the above embodiments, examples are described in which one lens holding section (support wall) is provided around the periphery of each single lens (the square shape of FIG. 4). However, the invention is not limited to this structure, and, for example, the following applications are also possible.

(1) A Side-Ways U-Shaped Lens Holding Section (FIG. 9)

Figure 9A:
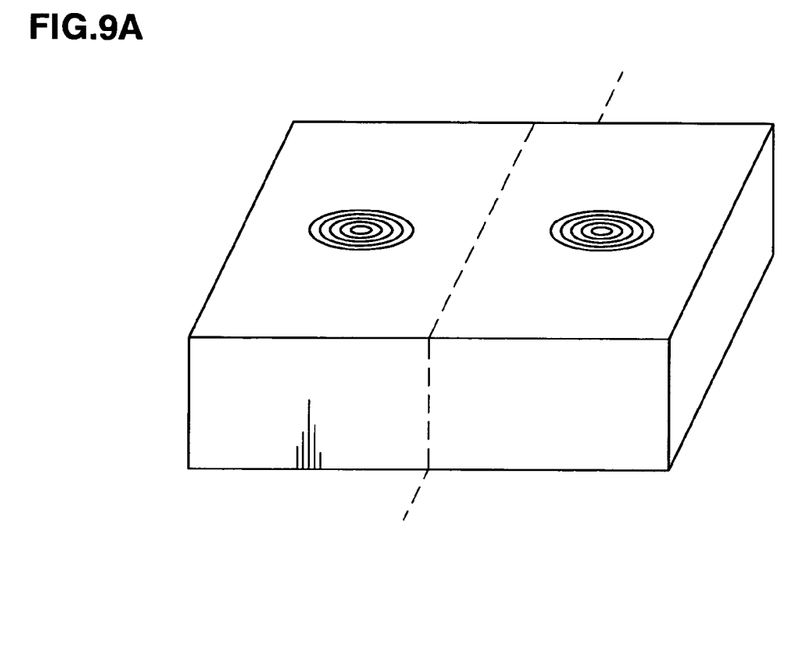
FIG. 9 is an explanatory drawing showing an example (a third applied example) in which a lens holding section is formed with a side-ways U-shape.
Figure 9B:
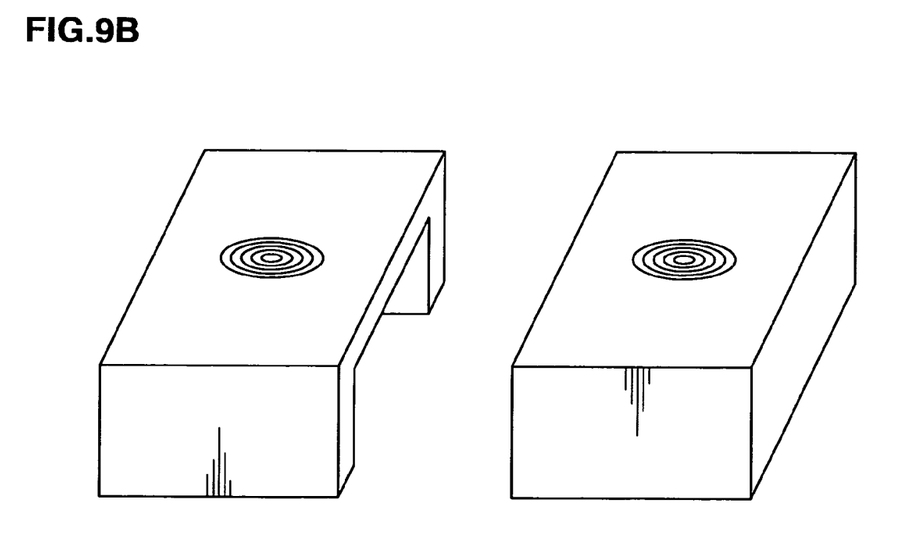

Referring to FIG. 9A, a lens holding section (support wall) is provided around two lenses. Then, as shown in FIG. 9B, the lens holding section is dice cut down the middle.

(2) A Side-Ways V-Shaped Lens Holding Section (Support Walls are Only Provided on Two Sides) (FIG. 10)

Figure 10A:
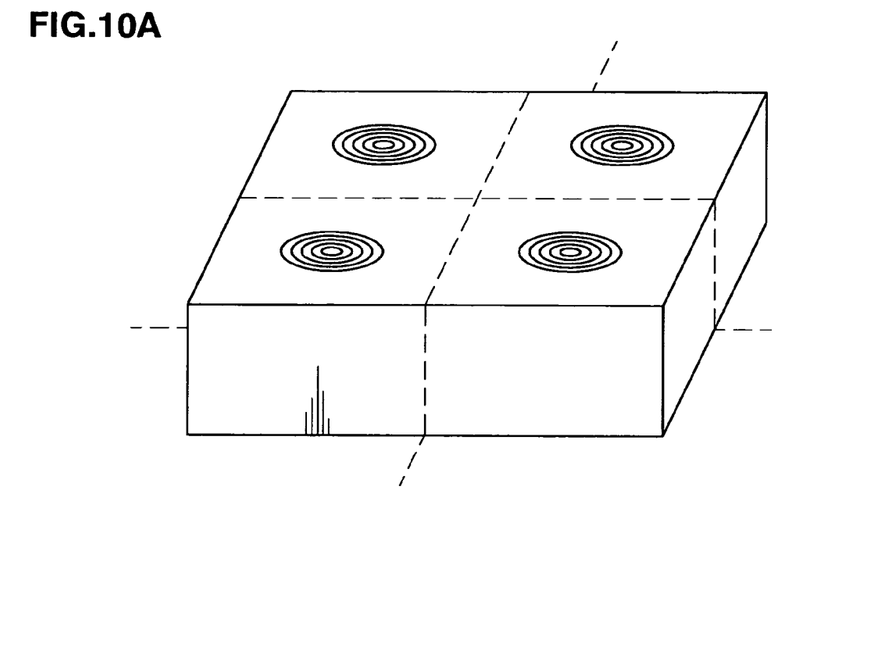
FIG. 10 is an explanatory figure showing an example (the third applied example) in which the lens holding section is formed with a side-ways V-shape.
Figure 10B:
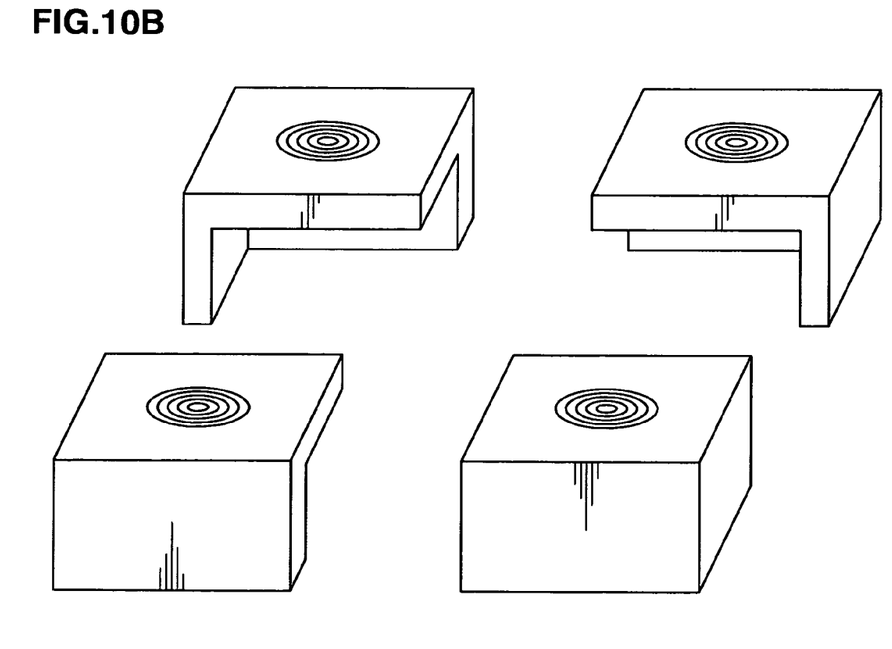

Referring to FIG. 10A, a lens holding section (support wall) is provided around four lenses. Then, as shown in FIG. 10B, the lens holding section is dice cut into four sections.

(3) An Array Lens in which a Lens Holding Section (Support Wall) is Provided Around a Plurality of Lenses (FIG. 11)

Figure 11A:
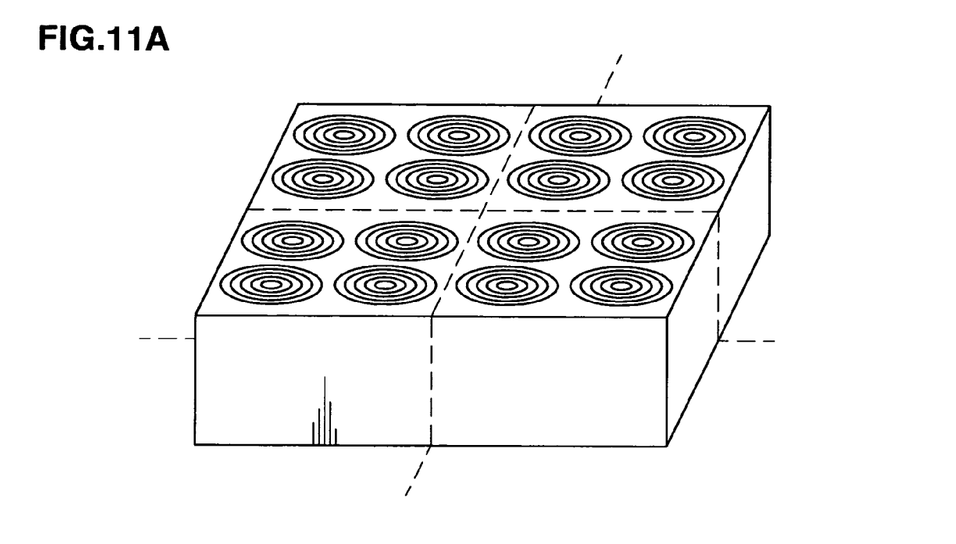
FIG. 11 is an explanatory figure showing an example (the third applied example) in which a lens array is formed.
Figure 11B:
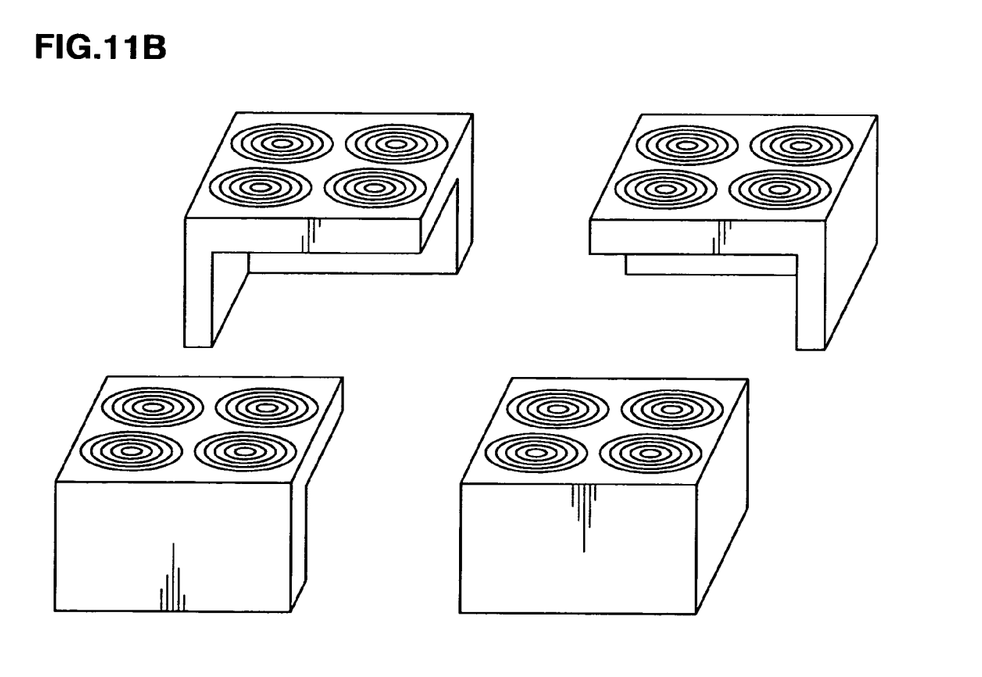

Referring to FIG. 11A, a lens holding section (support wall) is provided around sixteen lenses (in a four-by-four configuration). Then, as shown in FIG. 11B, then lens holding section is cut into four sections. The shape of the lens holding section may be a square, a side-ways U-shape, a side-ways V-shape, etc., in accordance with (1) and (2) above. Note that, after dice cutting is performed in the example of FIG. 11, one lens element includes for lens surfaces (in a two-by-two configuration). However, the number of lens is not limited to this structure, and, for example, 9 lenses may be provided (in a three-by-three configuration).

Hereinabove, preferred embodiments of the optical lens and the manufacturing method thereof according to the present invention have been described with reference to the appended drawings. However, the present invention is not limited to these examples. As will be obvious to a person skilled in the art, the invention permits of various modifications and changes without departing from the scope of the claims. Such modifications and changes are understood to come within the scope of the present invention.

For example, in the above described first embodiment an example is described with reference to FIG. 1C and FIG. 4A etc. of a process for forming the lens region including the lens surface 118 and the edge section 120 there around. More specifically, in this lens region forming process, the SOI layer 112, with the exception of a section corresponding to the lens region, is removed until the SiO$_2$ layer 114 is exposed. Accordingly, the SOI layer 112 only remains in the lens region including the lens surface 118 and the edge section 120 there around. However, the invention is not limited to this, and the optical lens 124 with the final shape may be formed without performing the lens region forming process. More particularly, etching mask that has a pattern with a desired shape may be used with respect to the structure shown in FIG. 1B, and etching performed. As a result, the optical lenses 124 with the shape shown in FIG. 1D can be manufactured without performing processing on the structure shown in FIG. 1C. This approach may similarly be applied to the second embodiment (FIG. 6C).

INDUSTRIAL APPLICABILITY

The present invention may be applied to an optical lens that is used in an optical device, and a manufacturing method for the optical lens. In particular, the invention may be applied to an optical lens that can be used in an infrared light region with a wavelength range from 0.70 µm to 11 µm, and a manufacturing method for the optical lens.

What is claimed is:

1. A method for manufacturing optical lenses using a substrate including a first layer, a second layer and a third layer, comprising the steps of:

forming a plurality of lens surfaces on a surface of the first layer of the substrate;

forming a respective lens holding section for each of the lens surfaces, each respective lens holding section holding a lens region including the lens surface for which the respective lens holding section is formed, and an edge section around the lens surface, said step of forming a respective lens holding section for each of the lens surfaces including removing the third layer, with the exception of sections of the third layer that correspond to the lens holding sections for the lens surfaces, until the second layer is exposed at a rear surface of the substrate; and separating respective optical lenses defined by the respective lens regions from the substrate after completing the lens holding section forming step.

2. The method for manufacturing an optical lens according to claim 1, wherein each lens surface has a thickness of 5 µm or less.

3. The method for manufacturing an optical lens according to claim 1, wherein the second layer is an etching resistant layer that is highly resistant to etching, and the lens holding section forming step further comprises an etching process step in which the second layer acts as an etching stopper.

4. The method for manufacturing an optical lens according to claim 1, further comprising: removing the second layer from a rear surface of the substrate after the lens holding section forming step is completed.

5. The method for manufacturing an optical lens according to claim 1, wherein the substrate is a silicon on insulator substrate.

6. A method for manufacturing optical lenses using a substrate including a first layer, a second layer and a third layer, comprising the steps of:

forming a plurality of lens surfaces on a surface of the first layer of the substrate;

forming for each lens surface a lens region including the lens surface and an edge section around the lens surface by removing the first layer, with the exception of a section of the first layer that corresponds to the lens region, until the second layer is exposed such that the first layer remains only in the lens region;

forming for each lens surface a lens holding section that holds the lens region by removing the third layer, with the exception of a section of the third layer that corresponds to the lens holding section, until the second layer is exposed at a rear surface of the substrate; and separating respective optical lenses defined by the respective lens regions from the substrate after completing the lens holding section forming step.

7. The method for manufacturing an optical lens according to claim 6, wherein the second layer is an etching resistant layer that is highly resistant to etching, and the lens region forming step further comprises an etching process step in which the second layer acts as an etching stopper.

8. A method for manufacturing an optical lens, comprising the steps of:

forming a plurality of lens surfaces on a surface of a substrate;

forming a lens region that includes the lens surface and an edge section around the lens surface by removing a predetermined thickness of the surface of the substrate, with the exception of a section of the surface that corresponds to the lens region, such that the predetermined thickness of the surface only remains in the lens region;

forming a lens holding section that holds the lens, region by removing a predetermined thickness of a rear surface of the substrate, with the exception of a section that corresponds to the lens holding section; and separating respective optical lenses defined by the respective lens regions from the substrate after the lens holding section forming step is completed.

9. The method for forming an optical lens according to claim 8, wherein the lens surface has a thickness of 5 μm or less.

10. The method for manufacturing an optical lens according to claim 8, wherein the substrate is a silicon on insulator substrate.

* * * * *